United States Patent [19]

Martin et al.

[11] Patent Number: 4,610,051
[45] Date of Patent: Sep. 9, 1986

[54] TURKEY THIGH SKINNER

[75] Inventors: Eugene G. Martin, New Holland; Michael E. Lease, Lancaster, both of Pa.

[73] Assignee: Favorite Manufacturing, Inc., New Holland, Pa.

[21] Appl. No.: 758,492

[22] Filed: Jul. 24, 1985

[51] Int. Cl.[4] .............................................. A22C 21/00
[52] U.S. Cl. ........................................ 17/11; 17/21; 17/50
[58] Field of Search ................. 17/11, 46, 1 G, 21

[56] References Cited

U.S. PATENT DOCUMENTS

| | | | |
|---|---|---|---|
| 3,119,144 | 1/1964 | Hill | 17/11 |
| 3,159,872 | 12/1964 | Hill | 17/45 |
| 3,579,714 | 5/1971 | Edwards, Sr. | 17/11 |
| 3,930,282 | 1/1976 | Martin et al. | 17/11 |
| 3,930,283 | 1/1976 | Martin | 17/11 |
| 4,041,572 | 8/1977 | Martin et al. | 17/46 |
| 4,073,040 | 2/1978 | Hill | 17/43 |
| 4,183,117 | 1/1980 | Meyn | 17/11 |
| 4,270,243 | 6/1981 | Lewis | 17/11 |
| 4,395,795 | 8/1983 | Hazenbroek | 17/52 |

*Primary Examiner*—Willie G. Abercrombie
*Attorney, Agent, or Firm*—Price, Heneveld, Huizenga & Cooper

[57] ABSTRACT

An apparatus for removing skin from the meat of a poultry part, such as a turkey thigh, includes an elongated conveyor supported on a frame in spaced relationship to an elongated loading and stretch bar. The conveyor moves the poultry part along the bar. A rotary cutter is positioned below the bar for cutting the skin of the part. Two pairs of counter-rotating, helical skinning rollers are positioned below the bar and downstream of the rotary cutter. Each pair of skinning rollers defines a nip. The rollers engage the skin on the poultry part and pull the skin from the part.

34 Claims, 19 Drawing Figures

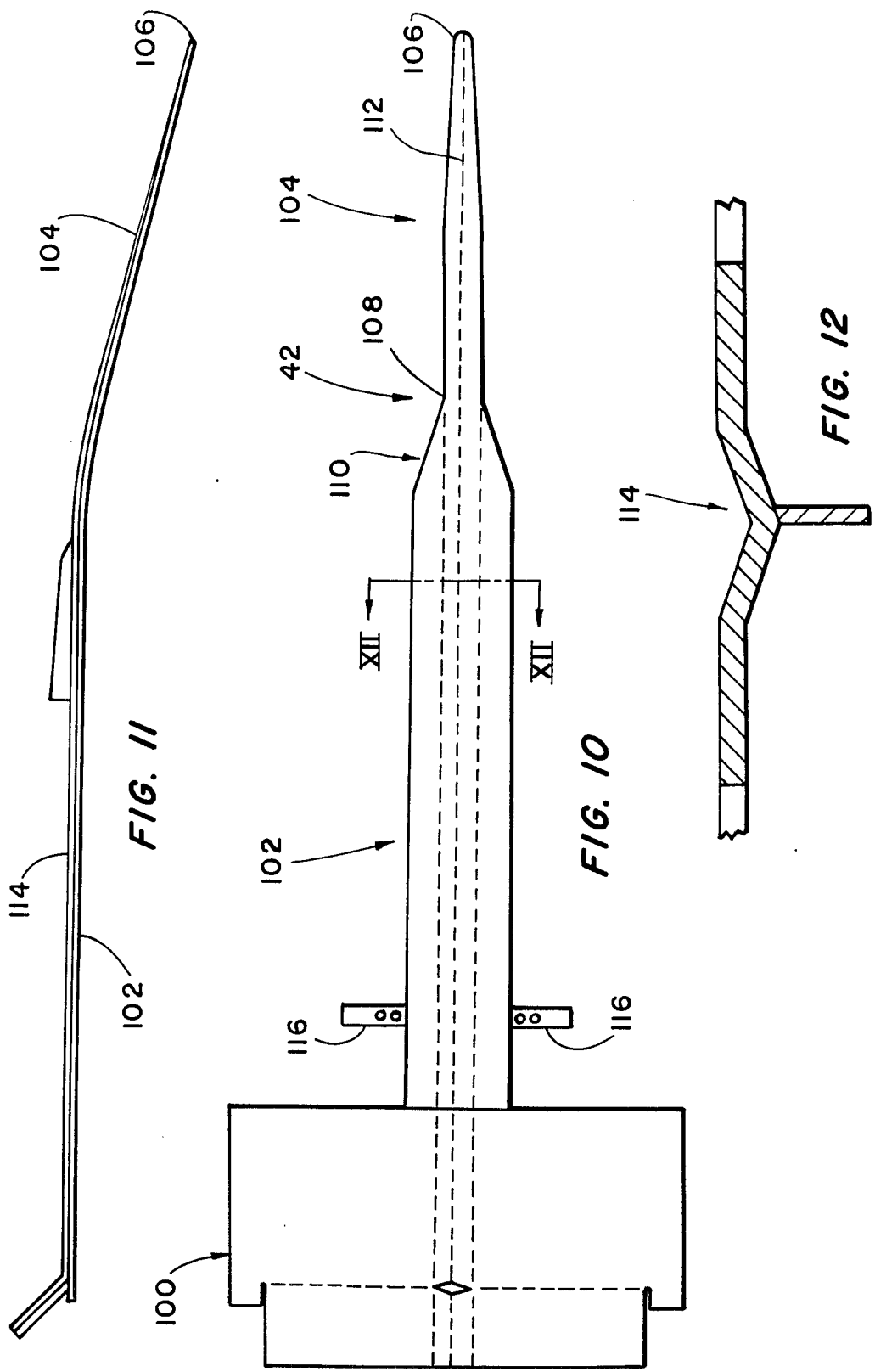

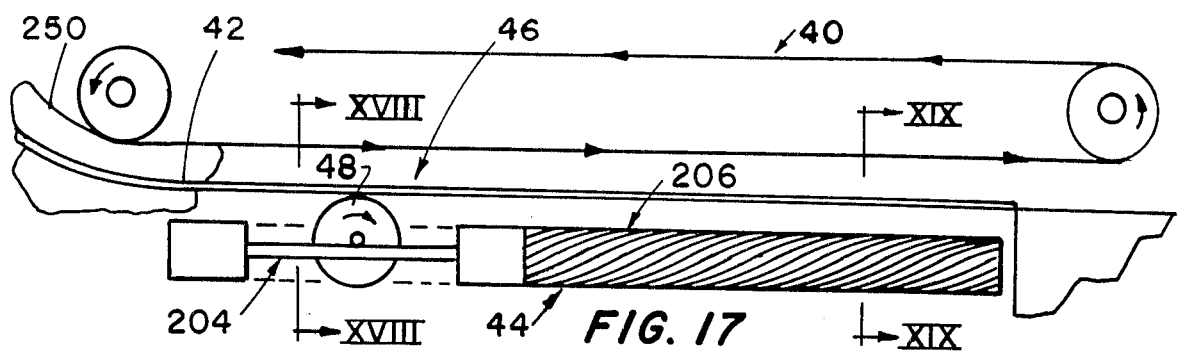
FIG. 17
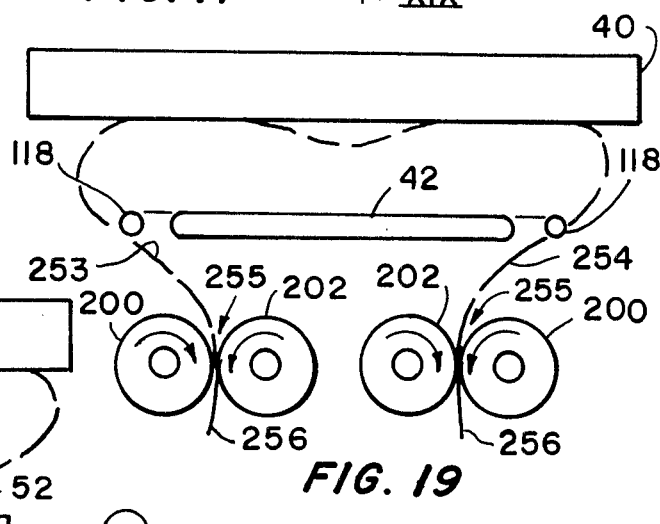
FIG. 19
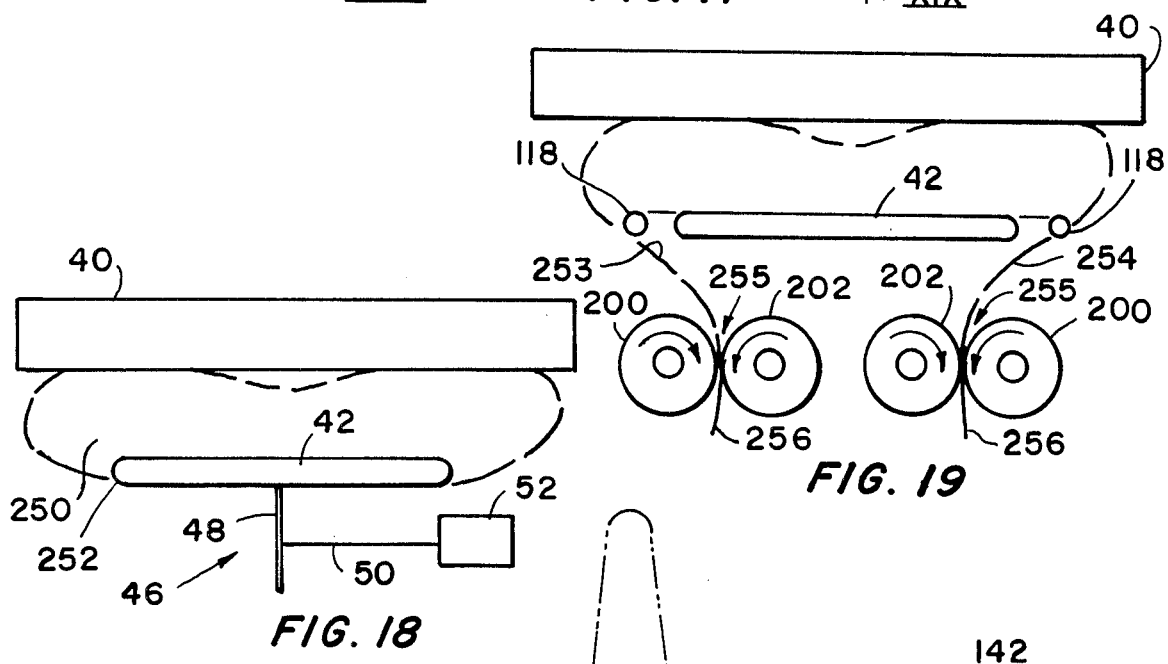
FIG. 18
FIG. 16

TURKEY THIGH SKINNER

BACKGROUND OF THE INVENTION

The present invention relates to poultry processing apparatus and more particularly to a unique apparatus for removing the skin from poultry pieces, such as turkey thighs.

Heretofore, various methods and machines have been used to increase the productivity of poultry processing operations. Such operations include the evisceration of a poultry carcass and separation of the carcass into its various component parts for subsequent processing, packaging and sale. The component parts may be subjected to deboning operations, skin removal operations and the like. Examples of machines developed to separate the parts may be found in U.S. Pat. No. 4,016,624, entitled POULTRY CUT-UP MACHINE and issued on Apr. 12, 1977 to Martin et al; and U.S. Pat. No. 4,385,421, entitled POULTRY LEG/BACK PROCESSOR and issued on May 31, 1983 to Martin.

Devices have been developed to remove skin from certain parts of poultry, such as necks, thighs and breasts. Many of these devices employ a set or pair of parallel, elongated rolls or rollers. The rollers have an intermeshing, spiral or helical cut configuration. The parallel rollers engage the skin and tear or pull the skin from the poultry part. Examples of these types of devices may be found in U.S. Pat. No. 3,119,144 entitled POULTRY GIZZARD PEELING ROLLS and issued on Jan. 28, 1964 to Hill; U.S. Pat. No. 3,579,714, entitled GIZZARD PROCESSING DEVICE and issued on May 25, 1971 to Edwards, Sr; U.S. Pat. No. 3,930,282, entitled MACHINE FOR PROCESSING THE BACKS OF POULTRY and issued on Jan. 6, 1976 to Martin et al; U.S. Pat. No. 3,930,283, entitled MACHINE FOR REMOVING SKIN FROM PIECES OF POULTRY and issued on Jan. 6, 1976 to Martin; and U.S. Pat. No. 4,073,040, entitled MACHINE FOR PROCESSING OF POULTRY GIZZARDS and issued on Feb. 14, 1978 to Hill.

U.S. Pat. No. 3,930,283 discloses an embodiment for processing poultry necks which includes a disc knife intersecting a channel formed between the upper portions of a pair of rolls. The disc knife slits the skin of the necks of poultry. The rolls have intermeshing, spiral configurations which engage the skin and pull the skin from the neck. In another embodiment, a chain-type feeder or conveyor engages a thigh or breast part and moves the part so that the skin is held against a pair of spiral rolls. The rolls engage and remove the skin from the part.

A need exists for a reliable and efficient poultry processing apparatus for removing the skin from poultry parts, such as turkey thighs, and which will accommodate different size poultry parts.

SUMMARY OF THE INVENTION

In accordance with the present invention, a unique poultry processing apparatus for removing the skin from a poultry part is provided. Essentially, the apparatus includes a frame supporting an elongated loading and stretch spike or bar, a conveyor positioned above the bar and a skinning means positioned below the bar for removing the skin from a poultry piece. Provision is made for cutting the skin as the piece is moved by the conveyor prior to engagement with the skinning means.

In narrower aspects of the invention, the skinning means includes two pairs of counter-rotating, intermeshing helical cut rollers. The skin of the poultry piece is cut so that each pair of rollers engages the skin flap and removes the skin from the piece. Provision is made for adjusting the relative positioning of the pairs of rollers with respect to each other and with respect to the loading spike or bar. In addition, provision is made for adjusting the nip or spacing between the rollers of each pair.

The poultry piece is loaded on the bar or spike so that the bar is interposed between the meat and the skin. The conveyor engages an upper surface of the poultry piece and moves the piece past the cutting means and past the skinning means. The apparatus in accordance with the present invention effectively removes the skin from a poultry piece or part without damaging the meat and without excess removal of meat during the skinning operation.

BRIEF DESCRIPTION OF THE DRAWINGS

FIG. 10 is a top, plan view of the loading bar;

FIG. 11 is a side, elevational view of the loading bar;

FIG. 12 is a cross-sectional view taken generally along line XII—XII of FIG. 10;

FIG. 16 is a front, elevational view showing the right and left helical support tube assemblies;

FIG. 17 is a schematic, side elevational view of an apparatus in accordance with the present invention;

FIG. 18 is a cross-sectional view taken generally along line XVIII—XVIII of FIG. 17; and FIG. 19 is an elevational view taken generally along line XIX—XIX of FIG. 17.

DETAILED DESCRIPTION OF THE PREFERRED EMBODIMENT

Figures 1, 2:
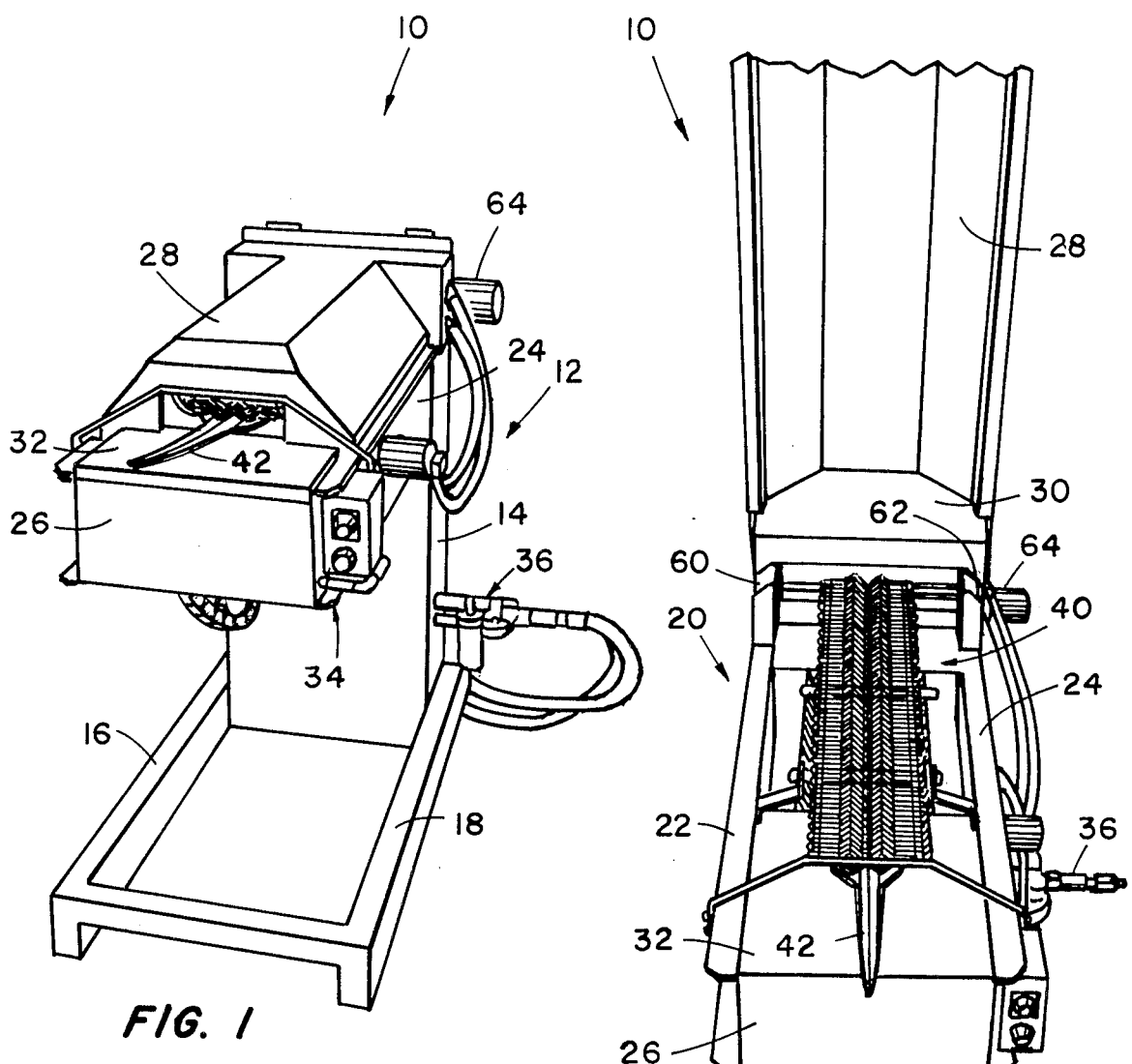
FIG. 1 is a front, perspective view of the apparatus in accordance with the present invention.
FIG. 2 is a front, perspective view of the apparatus of FIG. 1 with the top cover open.
Figure 3:
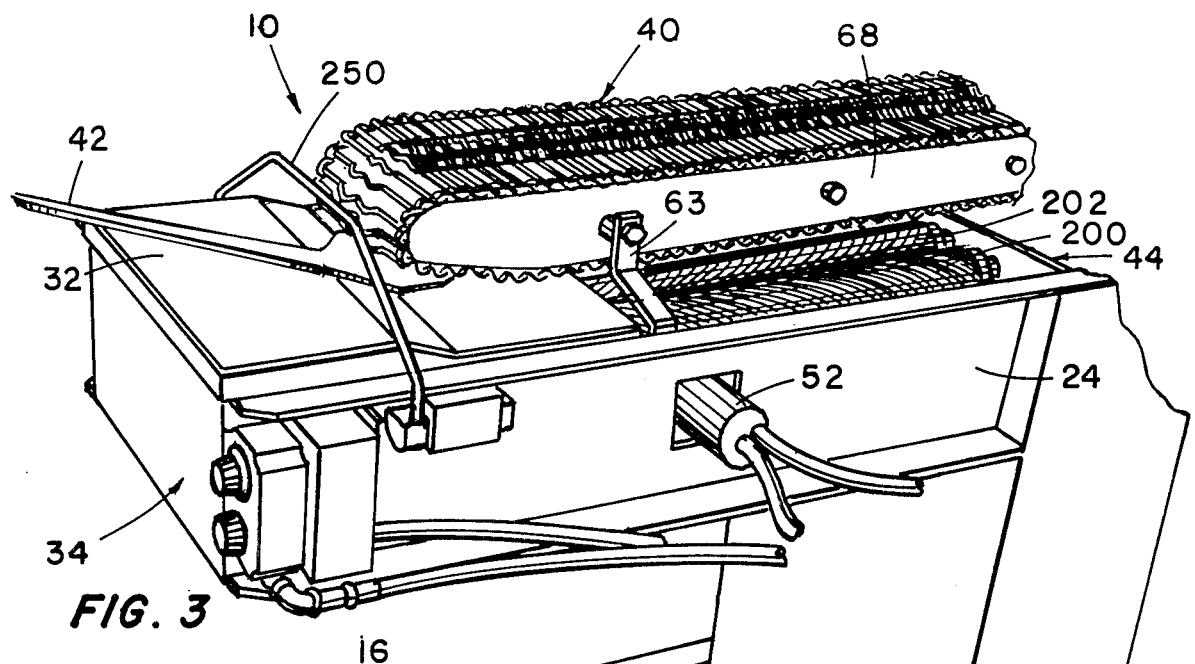
FIG. 3 is a side, perspective view of the apparatus showing the conveyor, a portion of the loading spike or bar and one pair of counter-rotating rollers.

A preferred embodiment of a skinning apparatus in accordance with the present invention is illustrated in FIGS. 1, 2 and 3 and generally designated 10. Apparatus 10 includes a stand 12 having a rear vertical portion 14 and floor engaging members 16, 18. Cantilevered from vertical portion 14 is a frame 20 having side members 22, 24 and a front member 26. A top cover or housing 28 is pivotally secured to vertical portion 14 at a rear end 30 thereof. As shown in FIG. 2, cover 28 may be pivoted to a raised position providing ready access to the elements of the skinner for repair, maintenance and cleaning purposes.

As seen in FIGS. 1 and 2, frame 20 and stand 12 support an infeed table 32, suitable controls 34 and hydraulic connections 36. The apparatus further includes a conveyor subassembly 40, a loading and stretch bar 42 and a skinning roller and support subassembly 44. Frame 20 supports a rotary cutter generally designated 46 and schematically illustrated in FIGS. 17 and 18. Cutter 46 includes a rotary blade 48 secured to a shaft 50. Shaft 50 is rotated by a suitable drive 52. As seen in FIG. 3, drive 52 is supported by side member 24 of frame 20.

CONVEYOR

Figure 6:
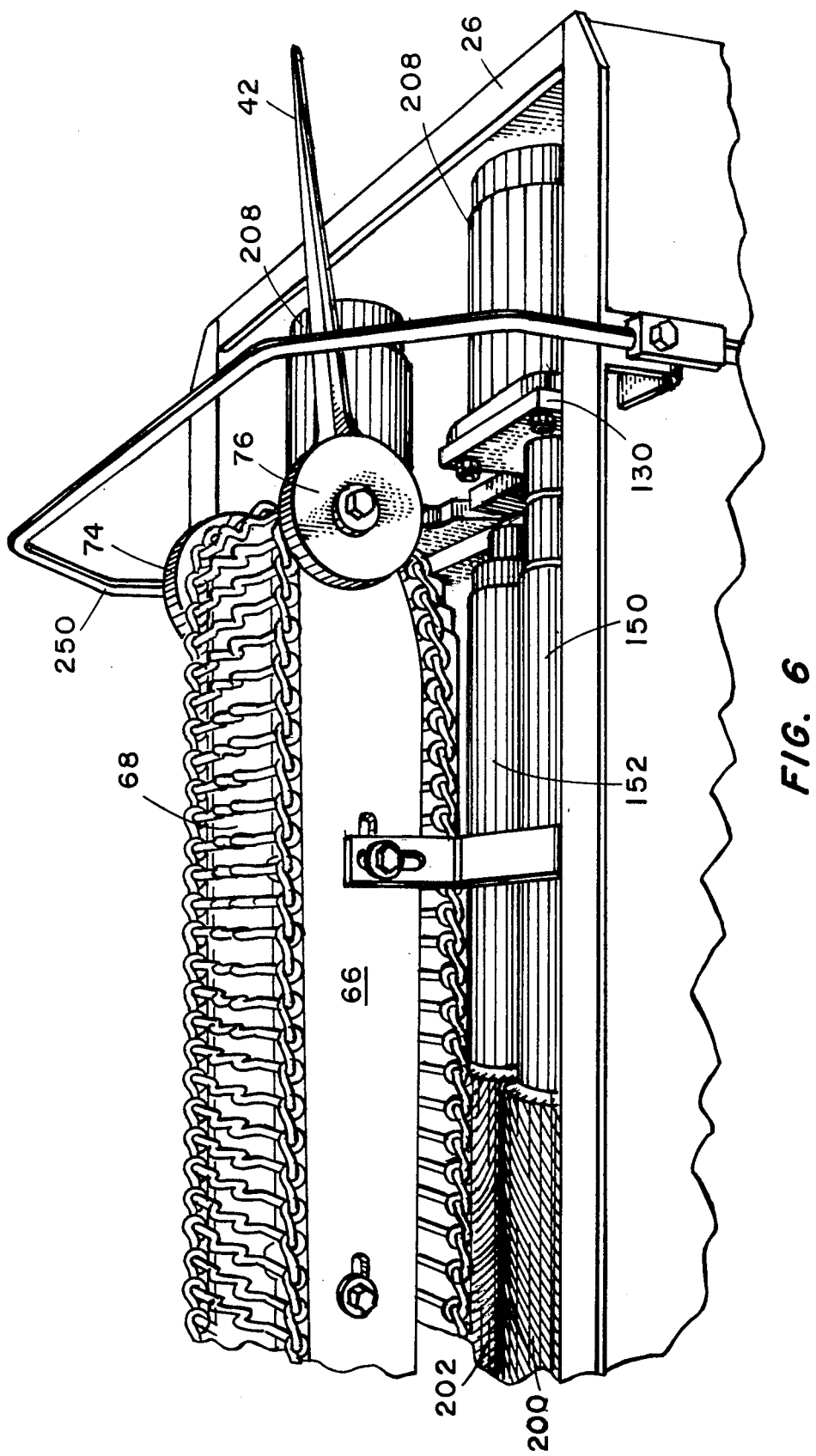
FIG. 6 is an enlarged, side perspective view showing the conveyor and a portion of the skinning rollers and support subassembly.
Figure 7:
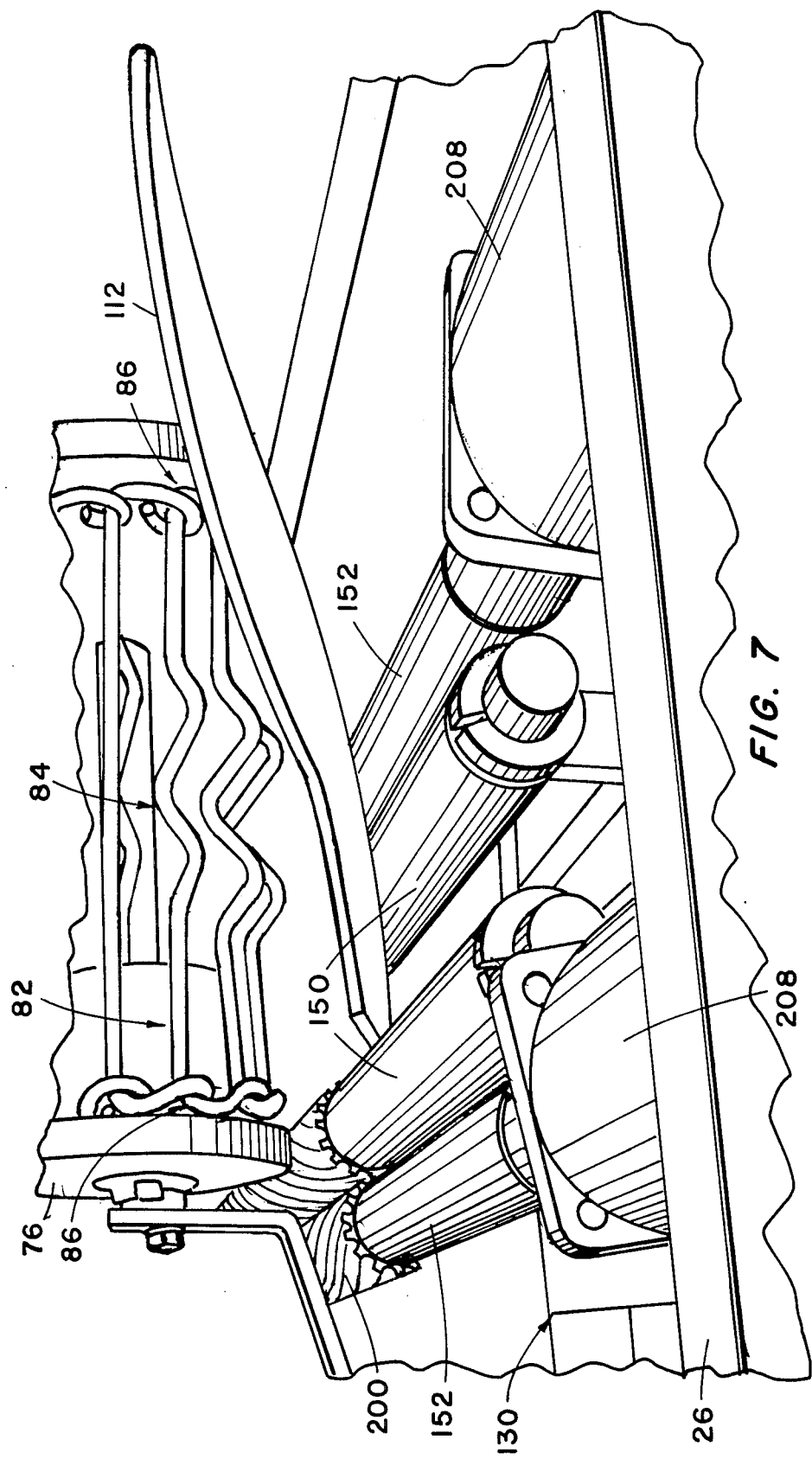
FIG. 7 is an enlarged, front, perspective view showing the infeed end of the apparatus.
Figure 8:
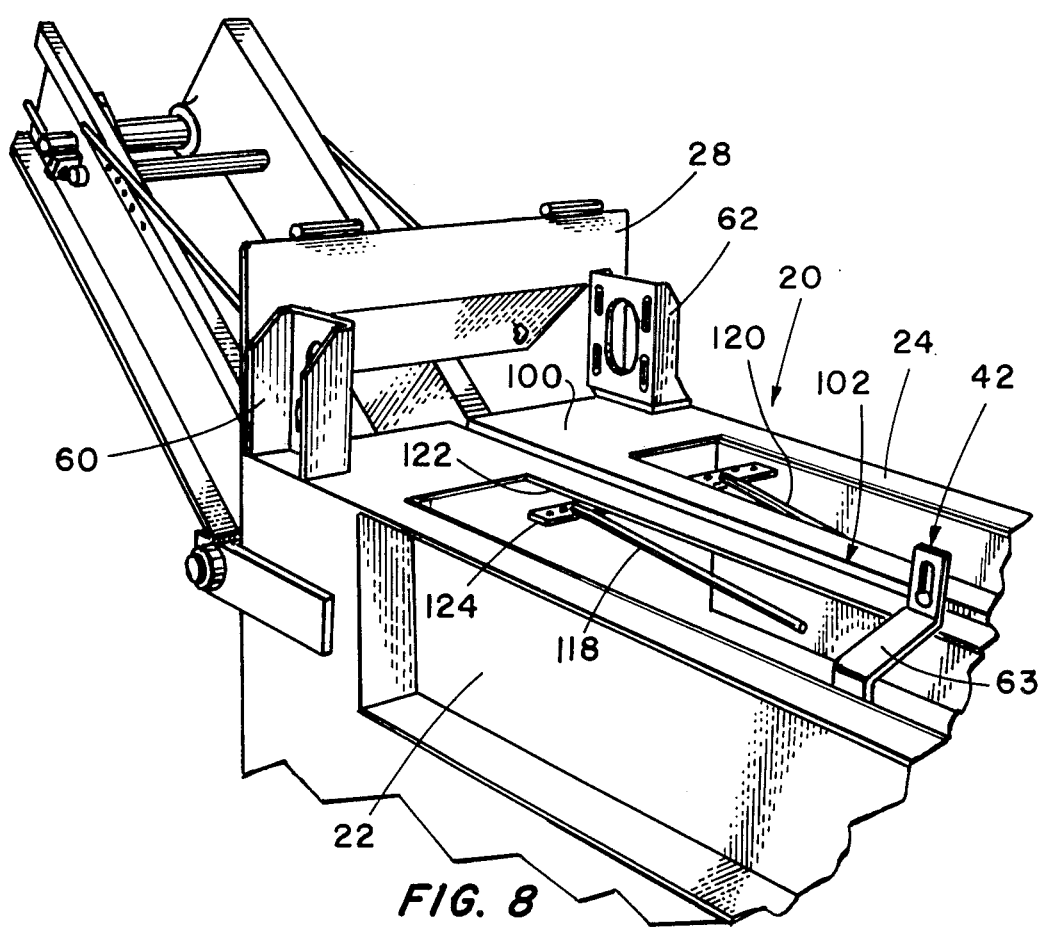
FIG. 8 is a perspective, side elevational view showing a portion of the frame, the loading and stretch bar and a portion of a discharge conveyor.

As seen in FIG. 8, frame 20 supports spaced conveyor mounting brackets 60, 62 and forward brackets 63. A conveyor drive 64 is secured to bracket 62 (FIG. 2). A pair of spaced, parallel elongated conveyor supports 66, 68 extend from brackets 60, 62 toward the infeed end of frame 20. A drive shaft 70 extends between brackets 60, 62. Shaft 70 supports a pair of spaced sprockets 72. Shaft 70 is rotated by drive 64. A pair of guides 74, 76 are rotatably supported at the forward ends of supports 66, 68 (FIG. 6). An endless chain belt 80 extends around drive sprockets 72, guides 74, 76 and along supports 66, 68. Belt 80 includes a plurality of interconnected links 82. Each link 82, as seen in FIG. 7 for example, includes a central, inverted V portion 84 and configured ends 86. Ends 86 of one link are hooked over or looped around the ends of the next adjacent link. The links, therefore, define an elongated, continuous chain belt.

LOADING AND STRETCH BAR

As seen in FIGS. 10, 11 and 12, loading and stretch bar 42 is a tapered, elongated member. Bar 42 includes a mounting plate 100, an elongated stretch portion 102 and a forward, elongated loading portion 104. Portion 104 tapers rearwardly from a free end 106 to a rear end 108. End 108 is joined to a transition portion 110 which tapers outwardly to stretch portion 102. Portion 104 is angled upwardly from horizontal for ease of loading of a poultry part. Bar 42 is symmetrical about a longitudinal axis 112. Bar 42 defines an inverted V portion 114 which extends along axis 112.

Extending outwardly from each lateral edge of stretch portion 102 adjacent mounting plate 100 are guide rod support mounts 116. As seen in FIG. 8, mounting plate 100 is welded or otherwise secured to frame 20 at the discharge end thereof. Bar 42 is cantilevered from frame 20 and extends forwardly toward the inlet end of the apparatus. Elongated guide rods 118, 120 are mountable along each side of stretch portion 102. A rear end 122 of each rod is disposed in a suitable aperture 124 defined by rod support mounts 116. Each support mount 116 includes a plurality of spaced apertures 124. As a result, guide rods 120, 118 are adjustably positionable outwardly from bar 42. As seen in FIG. 3 and as schematically illustrated in FIG. 17, bar 42 extends in spaced, juxtaposed, parallel relationship to conveyor 40. As described in more detail below, conveyor 40 will move a poultry part or piece along the top surface of bar 42 from the inlet end of the apparatus to the discharge end.

SKINNING ROLLER AND SUPPORT SUBASSEMBLY

Figure 9:
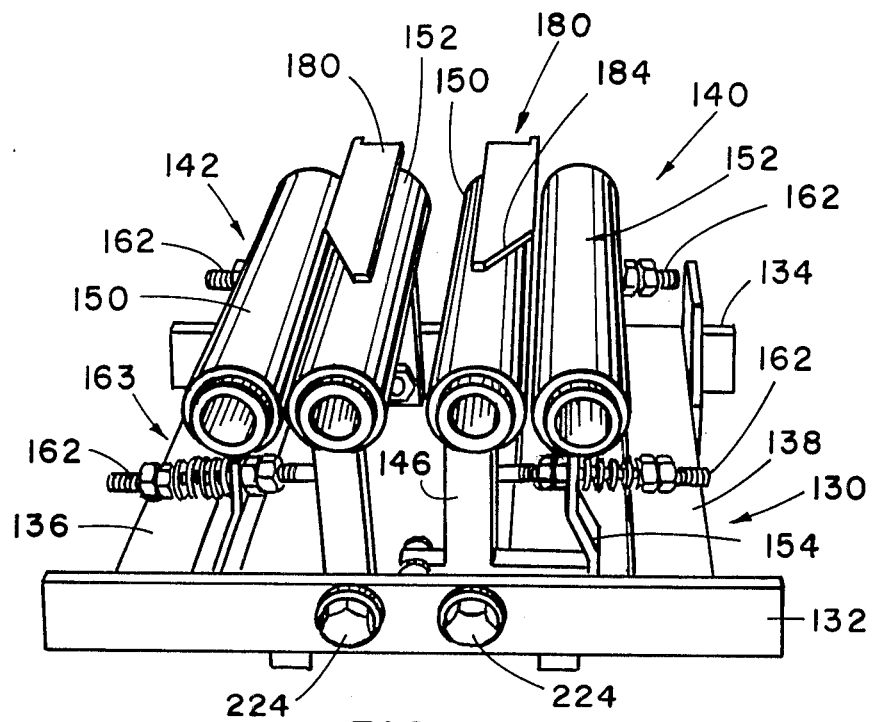
FIG. 9 is a perspective view of the skinning roller support subassembly.
Figures 14, 15:
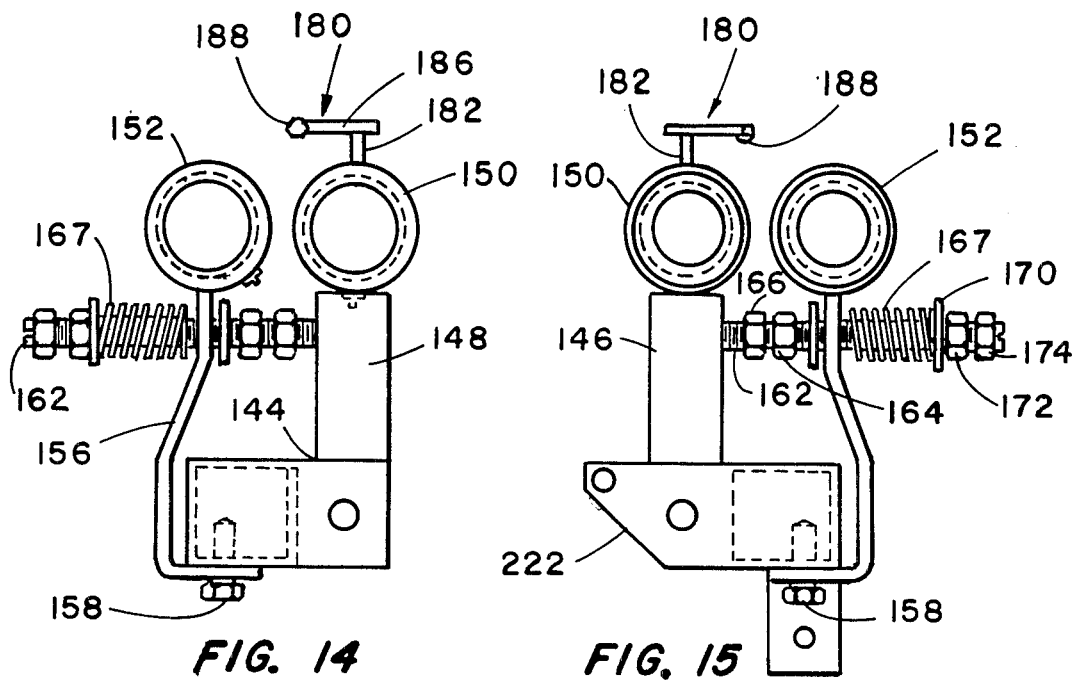
FIG. 14 is an end, elevational view of the support tube assembly of FIG. 13.
FIG. 15 is a front, elevational view of the support tube assembly of FIG. 13.
Figure 13:
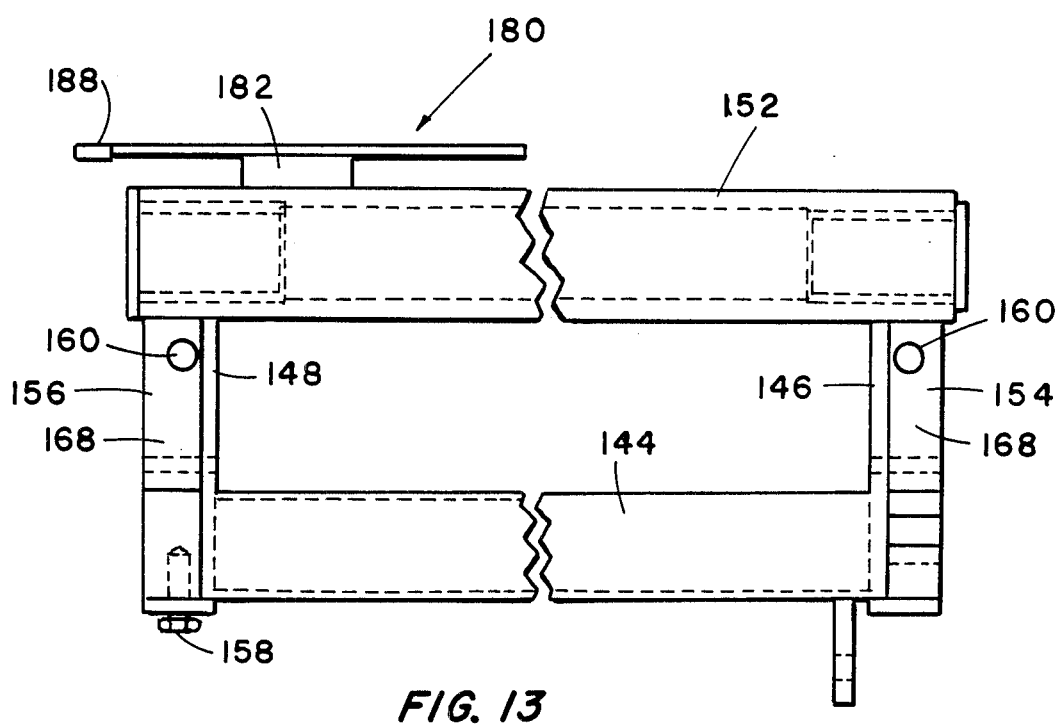
FIG. 13 is a side, elevational view of the right helical gear support tube assembly.

The skinning roller and support subassembly 44, as seen in FIG. 9, includes a subframe 130. Subframe 130 includes front and back members 132, 134 and side members 136, 138. Subframe 130 is supported on frame 20 and extends rearwardly from member 26 of frame 20 (FIG. 7). Mounted on subframe 130 are right and left helical support tube assemblies 140, 142. Assemblies 140, 142 are mirror images of each other. FIGS. 13, 14 and 15 illustrate the right helical support tube assembly 140. Assembly 140 includes an elongated base 144 and a pair of spaced, vertical uprights 146, 148. Extending between uprights 146, 148 is an inner support tube 150. An outer support tube 152 is secured to base 144 by a pair of spaced mounting plates or arms 154, 156. Each arm 154, 156 is secured to base 144 by a suitable fastener 158.

Subassemblies 163 adjust the positioning of tubes 150, 152 with respect to each other. As seen in FIG. 13, each arm 154, 156 defines an aperture 160. Extending through aperture 160 is a threaded shaft or stud 162. An adjustment nut 164 and a lock nut 166 are threaded on shaft 162 inside of the support arms. A spring 167 is disposed between an outer face 168 of each arm, a washer 170, an adjustment nut 172 and a lock nut 174. Threading nut 172 toward arm 154 or 156 compresses spring 166 against its respective plate 154, 156. Spring 166 bends the arm toward the vertical uprights 146, 148. As a result, the nip or space between parallel tubes 152, 150 may be adjusted. Tube 150 in effect floats against the bias of spring 167 with respect to tube 152.

Figure 4:
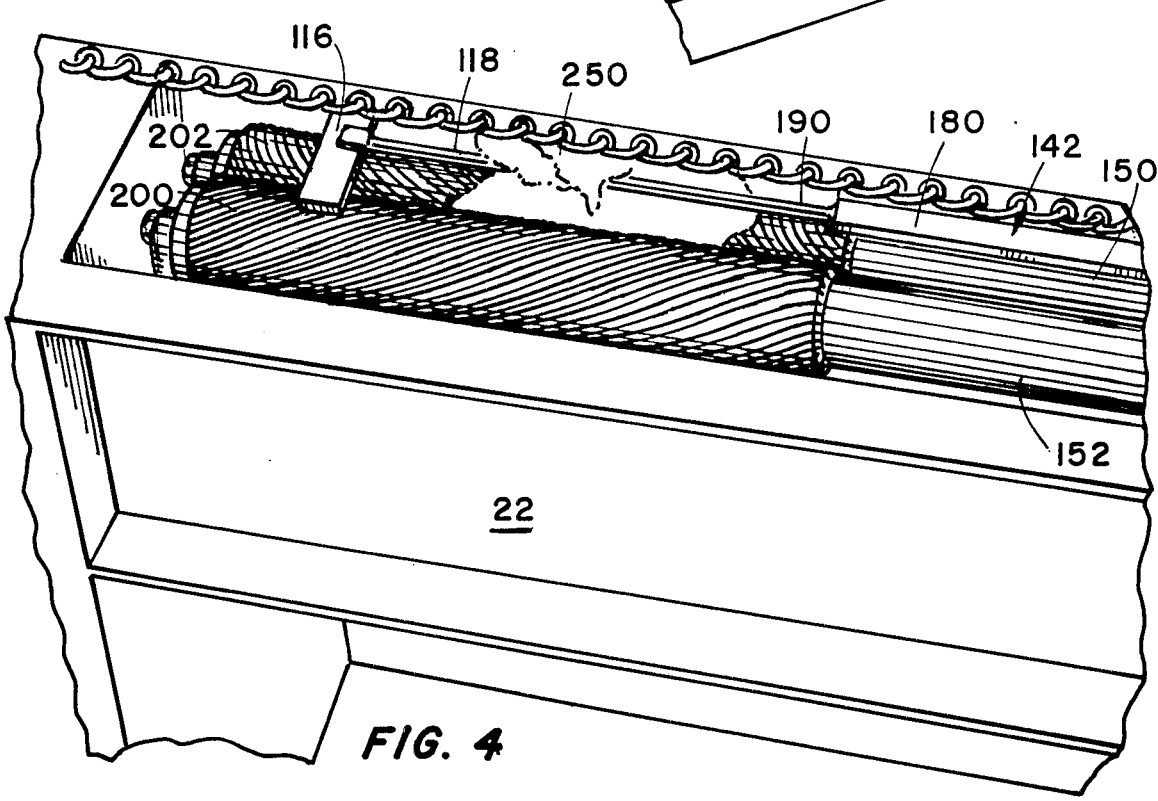
FIG. 4 is an enlarged, perspective view showing the skin of the poultry piece being engaged by a pair of skinning rollers.
Figure 5:
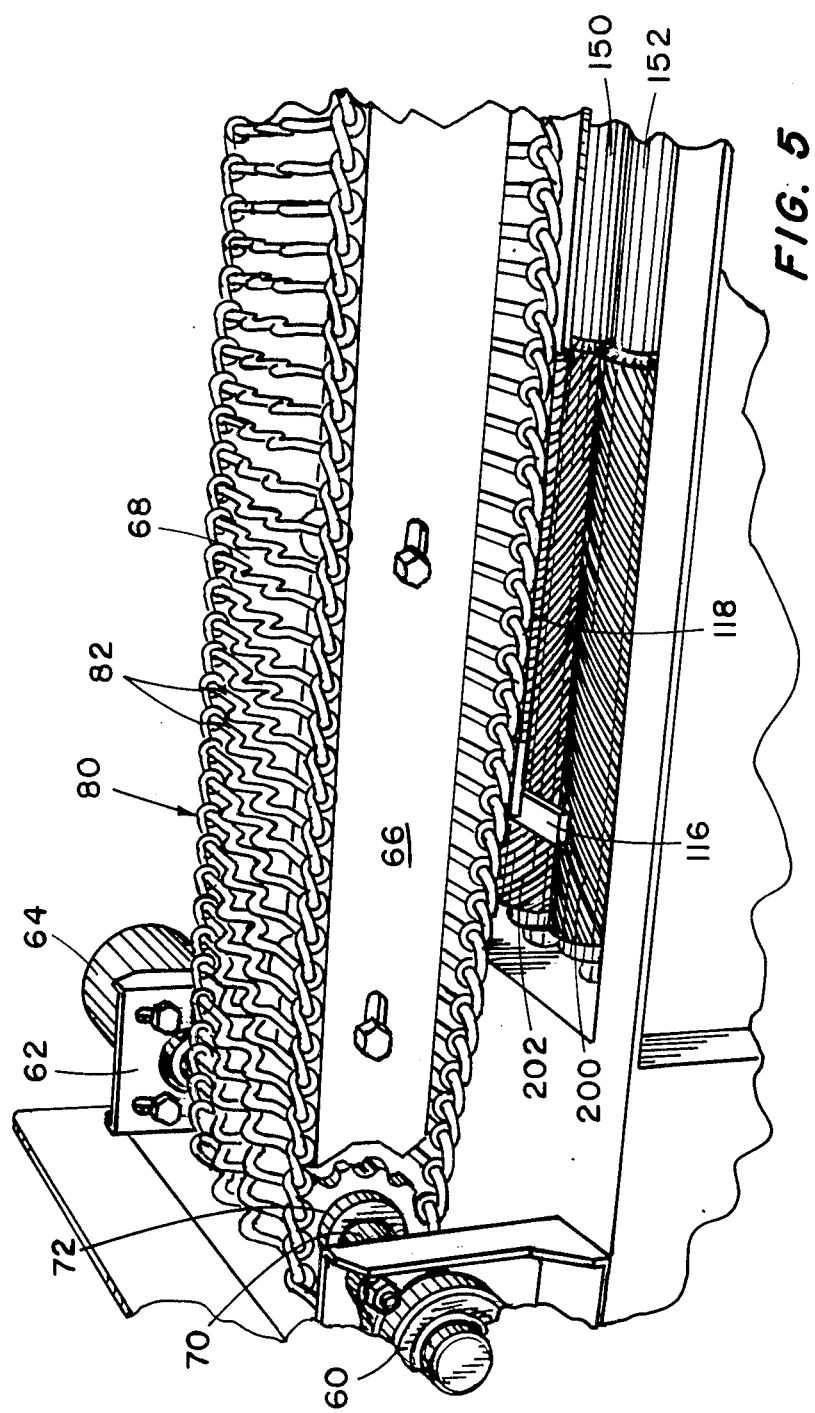
FIG. 5 is an enlarged, perspective view showing a portion of the conveyor.

A guide plate 180 is secured to the top of each tube 150 of assemblies 140, 142. Plate 180 is supported in spaced, parallel, generally horizontal relationship to tube 150 by a vertical mount 182. Plate 180 is a generally flat member having an outwardly angled front face 184. Rear end 186 of plate 180 defines a generally circular boss or mount 188. As seen in FIG. 4, an end 190 of guide rod 118 is received within and supported by boss 188. As explained in more detail below, plates 180 and rods 118 guide a skin flap into proper position.

Each support tube assembly 140, 142 rotatably mounts a pair of counter-rotating helically cut or spirally configured skinning rollers 200, 202. Each roller 200, 202 includes an elongated shaft portion 204 and an elongated, helically cut portion 206 (FIG. 17). Shaft portion 204 extends within a respective support tube 150, 152. A drive motor 208 is coupled to shaft 204 of the outermost roller 200 supported by roller tube 152. Since helically cut portions 206 of each of the rolls or rollers 200, 202 intermesh, rotation of an outer roller 200 results in counter-rotation of an inner roller 202. Subassemblies 163 permit tube 150 and hence outer roller 200 to float with respect to roller 202. This prevents or reduces the chance of damage to the rollers.

As shown in FIG. 16, provision is made for adjustment of the relative positioning of support tube assemblies 140, 142. Each assembly 140, 142 includes an oppositely cut or beveled block 220, 222, respectively. Bases 140 are pivotally mounted between cross pieces 132, 134 of frame 130 by pivots 224. A link 226 has an end 228 pivoted to portion 220 by pin 230 and an end 232 pivoted to portion 220 of the left-hand assembly by a pin 234. A turnbuckle 240 also interconnects the subassemblies. As seen in FIG. 16, turnbuckle 240 includes an eye 242 pivoted to the left-hand subassembly and an eye 244 pivoted to the right-hand subassembly. Rotation of threaded member 246 of turnbuckle 240 moves the eyes 242, 244 toward and away from each other. This results in movement of the support tubes toward and away from each other, as indicated in FIG. 16 by arrows a. The support tube assemblies and hence the pair of counter-rotating rollers extend along and below the outer lateral edges of the stretch portion 102 of bar 42. The relative positioning of the skinning rollers may be readily adjusted to accommodate different size poultry parts.

As schematically shown in FIG. 17, rotary disc 48 of cutting mechanism 46 is positioned between support tube assemblies 140, 142 and centrally of bar 42. The blade is positioned upstream of the helically cut gear portions 206 of the skinning rolls. Disc 48 is positioned to cut the skin of a poultry part centrally as the part is moved through the apparatus by conveyor 40.

OPERATION

In operation, a turkey thigh 250 is slipped onto loading portion 104 of bar 42. With a turkey thigh, the skin 252 is secured to the meat only along the lateral edges of the piece. The piece is slipped onto the loading spike or bar portion so that the meat is on the upper surface of the spike and the skin extends along the undersurface of the spike. As shown in FIG. 3, poultry piece 250 is engaged by conveyor 40 and moves along bar 42 to stretch portion 102. Portion 102 stretches skin 252 which is slit by cutter 48. Cutter 48 separates skin 252 into a pair of skin flaps 253, 254, as schematically shown in FIG. 19. The flaps are engaged by guide plates 180 so that their lower or free ends 256 are moved into nips 255 defined by skinning rollers 200, 202. As the flaps move into the spaces or nips between the rollers, the rollers engage the skin and pull the skin from the meat of poultry piece 250. As shown in FIG. 4, rods 118 extending between mounts 116 and guide plates 180 guide the skin as the poultry part moves along the skinning rollers.

Elongated bar 42 protects the meat of the poultry piece as it moves through the skinning apparatus. The bar provides a surface against which cutting blade 48 works to slit the skin longitudinally of the part. Blade 48 will not cut the meat of the part. Guide plates 180 and guide rods 118 insure that the skin flaps created are properly received within the nips of the counter-rotating rollers. Plates 180 act as an adjustable extension of bar 42. The relative positioning of the pairs of rollers is readily adjusted to accommodate different size poultry pieces. Efficient and complete skin removal is accomplished.

In view of the foregoing description, those of ordinary skill in the art will undoubtedly envision various modifications to the present invention which would not depart from the inventive concepts disclosed. It is, therefore, expressly intended that the above description should be considered as only that of the preferred embodiment. The true spirit and scope of the present invention may be determined by reference to the appended claims.

The embodiments of the invention in which an exclusive property or privilege is claimed are defined as follows:

1. A skinner apparatus for removing the skin from the meat of a poultry part, said apparatus comprising:

a frame;

a loading spike having a free end and a fixed end secured to said frame;

a conveyor supported on said frame in spaced, juxtaposed relationship to said loading spike for conveying the poultry part along said spike;

cutting means on said frame below said loading spike for cutting the skin of a poultry part on said spike; and skinning means on said frame, positioned below and extending adjacent said loading spike for engaging the skin and pulling the skin from said poultry part.

2. A skinner apparatus as defined by claim 1 wherein said skinning means comprises:

a pair of counter-rotating, elongated, helical rollers positioned in spaced, parallel relationship to define a nip for receipt of the skin of the poultry part; and a support assembly on said frame for supporting said rollers, said support assembly including adjustment means for adjusting the size of said nip.

3. A skinner apparatus as defined by claim 2 wherein said skinning means further comprises:

another pair of counter-rotating, elongated, helical rollers positioned in spaced relationship and defining another nip; and another support assembly on said frame and supporting said another pair of rollers in generally spaced, parallel relationship to said a pair of counter-rotating rollers, said another support assembly including means for adjusting the size of the nip defined by said another pair of rollers.

4. A skinner apparatus as defined by claim 3 wherein said skinning means further comprises:

support adjustment means operatively connected to said support assemblies for adjusting the relative position of said assemblies to each other and their transverse positioning relative to said loading spike.

5. A skinner apparatus as defined by claim 1 further including:

a guide rod supported adjacent to said loading spike fixed end and extending along said skinning means.

6. A skinner apparatus as defined by claim 2 further including:

a guide rod fixed to said loading spike adjacent the fixed end thereof and extending along said skinning means.

7. A skinner apparatus as defined by claim 3 further including:

a guide rod fixed to said loading spike adjacent the fixed end thereof and extending along said skinning means.

8. A skinner apparatus as defined by claim 4 further including:

a pair of guide rods, each rod supported adjacent said loading spike fixed end and extending along said skinning means.

9. A skinner apparatus as defined by claim 1 wherein said conveyor comprises:

an endless chain link belt including a plurality of transversely extending wire links, each link being configured to engage the poultry part and move the part along said loading spike.

10. A skinner apparatus as defined by claim 1 wherein said conveyor comprises:

an endless chain link belt including a plurality of transversely extending wire links, each link being configured to engage the poultry part and move the part along said loading spike.

11. A skinner apparatus as defined by claim 1 wherein said conveyor comprises:
an endless chain link belt including a plurality of transversely extending wire links, each link being configured to engage the poultry part and move the part along said loading spike.

12. A skinner apparatus as defined by claim 1 wherein said loading spike is an elongated, generally planar member tapering from said free end to said fixed end so as to be generally triangular in plan view.

13. A skinner apparatus as defined by claim 12 wherein said loading spike includes an elongated, generally planar main portion and an upwardly angled infeed portion extending from said free end to said main portion.

14. A skinner apparatus as defined by claim 4 wherein said loading spike is an elongated, generally planar member tapering from said free end to said fixed end so as to be generally triangular in plan view.

15. A skinner apparatus as defined by claim 14 wherein said loading spike includes an elongated, generally planar main portion and an upwardly angled infeed portion extending from said free end to said main portion.

16. A skinner apparatus as defined by claim 15 wherein said loading spike is an elongated, generally planar member tapering from said free end to said fixed end so as to be generally triangular in plan view.

17. A skinner apparatus as defined by claim 16 wherein said loading spike includes an elongated, generally planar main portion and an upwardly angled infeed portion extending from said free end to said main portion.

18. A skinner apparatus as defined by claim 11 wherein said loading spike is an elongated, generally planar member tapering from said free end to said fixed end so as to be generally triangular in plan view.

19. A skinner apparatus as defined by claim 18 wherein said loading spike includes an elongated, generally planar main portion and an upwardly angled infeed portion extending from said free end to said main portion.

20. A thigh skinner adapted to remove the skin from a turkey thigh and the like, said thigh skinner comprising:
a first pair of elongated skinner rollers extending in spaced, generally parallel, horizontal relationship to define a nip;
a second pair of elongated skinner rollers extending in spaced, generally parallel, horizontal relationship to define a second nip;
support means operatively connected to said pairs of skinner rollers for supporting and adjustably positioning said pairs of rollers with respect to each other;
an elongated loading bar positioned above and generally between said pairs of skinner rollers;
a conveyor positioned above said loading bar for moving a thigh along said bar and over said skinner rollers;
cutting means positioned below said loading bar for cutting the skin of the thigh; and
drive means operatively connected to said rollers for rotating said rollers.

21. A thigh skinner as defined by claim 20 wherein said support means comprises:
a frame;
a first support member supporting said first pair of skinner rollers;
a second support member supporting said second pair of skinner rollers, said support members being rotatably supported on said frame; and
linkage means interconnecting said support members for adjustably linking said members together so that the spacing between said pairs of rollers may be adjusted.

22. A thigh skinner as defined by claim 21 wherein said rollers each include an elongated shaft portion and wherein said support means includes two pairs of support tubes, each of said elongated shaft portions being rotatably disposed within one of said support tubes.

23. A thigh skinner as defined by claim 22 wherein one of said tubes of each of said pairs is fixed to one of said first and second support members and wherein said support means includes means for adjustably supporting the other of the tubes of each of said pairs.

24. A thigh skinner as defined by claim 21 wherein said linkage means comprises:
a link pivotally interconnecting opposed sides of said support member; and
adjustment means connected to each of said support member for adjusting the relative positions of said members.

25. A thigh skinner as defined by claim 24 wherein said rollers each include an elongated shaft portion and wherein said support means includes two pairs of support tubes, each of said elongated shaft portions being rotatably disposed within one of said support tubes.

26. A thigh skinner as defined by claim 20 wherein said loading bar is tapered from a loading end to a discharge end.

27. A thigh skinner as defined by claim 26 wherein said support means includes guide plates positioned adjacent said loading bar for guiding the skin into the nips defined by said skinner rollers.

28. A thigh skinner as defined by claim 27 further including:
a pair of elongated guide rods extending from said guide plates along and towards said discharge end of said loading bar.

29. A thigh skinner as defined by claim 28 wherein said support means comprises:
a frame;
a first support block supporting said first pair of skinner rollers;
a second support block supporting said second pair of skinner rollers, said support blocks being rotatably supported on said frame; and
linkage means interconnecting said support blocks for adjustably linking said blocks together so that the spacing between said pairs of rollers may be adjusted.

30. A thigh skinner as defined by claim 29 wherein said rollers each include an elongated shaft portion and wherein said support means includes two pairs of support tubes, each of said elongated shaft portions being rotatably disposed within one of said support tubes.

31. A thigh skinner as defined by claim 30 wherein one of said tubes of each of said pairs is fixed to one of said first and second support blocks and wherein said support means includes means for adjustably supporting the other of the tubes of each of said pairs.

32. A thigh skinner as defined by claim 31 wherein said linkage means comprises:

a link pivotally interconnecting opposed sides of said support blocks; and adjustment means connected to each of said support blocks for adjusting the relative positions of said blocks.

33. A thigh skinner as defined by claim 20 wherein said loading bar defines an upwardly angled, tapered loading portion, an elongated stretch portion and a longitudinally extending inverted V-shaped portion.

34. A thigh skinner as defined by claim 33 wherein said conveyor is an endless link belt conveyor.

* * * * *

UNITED STATES PATENT AND TRADEMARK OFFICE
CERTIFICATE OF CORRECTION

PATENT NO. : 4,610,051

DATED : September 9, 1986

INVENTOR(S) : Eugene G. Martin et al

It is certified that error appears in the above-identified patent and that said Letters Patent is hereby corrected as shown below:

Column 8, line 26:

"member" should be --members--.

Signed and Sealed this

Tenth Day of March, 1987

Attest:

DONALD J. QUIGG

*Attesting Officer*      *Commissioner of Patents and Trademarks*